(12) United States Patent
Nejdl

(10) Patent No.: US 10,914,628 B2
(45) Date of Patent: Feb. 9, 2021

(54) APPARATUS FOR SPECTRUM AND INTENSITY PROFILE CHARACTERIZATION OF A BEAM, USE THEREOF AND METHOD THEREOF

(71) Applicant: FYZIKALNI USTAV AV CR, V.V.I., Prague (CZ)

(72) Inventor: Jaroslav Nejdl, Dolni Brezany (CZ)

(73) Assignee: FYZIKALNI USTAV AV CR, V. V. I., Prague (CZ)

( * ) Notice: Subject to any disclaimer, the term of this patent is extended or adjusted under 35 U.S.C. 154(b) by 0 days.

(21) Appl. No.: 16/386,302

(22) Filed: Apr. 17, 2019

(65) Prior Publication Data

US 2019/0242746 A1 Aug. 8, 2019

Related U.S. Application Data

(63) Continuation of application No. PCT/CZ2017/050050, filed on Oct. 21, 2017.

(30) Foreign Application Priority Data

Oct. 21, 2016 (CZ) ...................................... 2016-661

(51) Int. Cl.
*G01J 3/28* (2006.01)
*G01J 1/42* (2006.01)
(Continued)

(52) U.S. Cl.
CPC ............. *G01J 1/4257* (2013.01); *G01J 1/429* (2013.01); *G01J 3/021* (2013.01); *G01J 3/0237* (2013.01);
(Continued)

(58) Field of Classification Search
CPC .. G01J 1/4257; G01J 3/18; G01J 3/021; G01J 2003/1847; G01J 3/0237; G01J 3/0262;
(Continued)

(56) References Cited

U.S. PATENT DOCUMENTS

2009/0262346 A1* 10/2009 Egloff .................. G01J 3/02
356/326
2012/0154902 A1 6/2012 Boullet et al.
(Continued)

FOREIGN PATENT DOCUMENTS

EP 1 288 652 A2 3/2003
EP 1 396 716 A2 3/2004
EP 3076208 A1 10/2016

OTHER PUBLICATIONS

Frank Scholze et al: "New PTB beamlines for high-accuracy EUV reflectometry at BESSY II", Proceedings Optical Diagnostics of Living Cells II, vol. 4146, Nov. 8, 2000 (Nov. 8, 2000), pp. 72-82, XP0554440021,US ISSN: 0277-786X, DOI: 10.1117/12.406678, ISBN: 978-1-5106-1324-9 figure 1.

*Primary Examiner* — Abdullahi Nur
(74) *Attorney, Agent, or Firm* — Gabriela B. Tomescu, Esq.; Bergenstråhle & Partners AB

(57) ABSTRACT

The present invention concerns an apparatus for spectral and intensity profile characterization comprising: a diffractive element; a beam block (3) attached to the diffractive element, the beam block (3) being positioned so as to block the passage of the direct incoming beam (1) which is not incident on the diffractive element; a device for translation of the beam block (3) and the diffractive element; reflective element (4); fixed detector (5) positioned on the axis of the incoming beam (1). The invention also concerns use and a method thereof. Such a compact system provides application in the field of spectrometry and diagnostics of the beam intensity profile, especially in the area of XUV and soft X-rays.

16 Claims, 2 Drawing Sheets

(51) Int. Cl.
  *G01J 3/02* (2006.01)
  *G01J 3/18* (2006.01)
  *G01N 23/207* (2018.01)

(52) U.S. Cl.
  CPC .......... *G01J 3/0262* (2013.01); *G01J 3/0289* (2013.01); *G01J 3/18* (2013.01); *G01N 23/2076* (2013.01); *G01J 2003/1847* (2013.01); *G01N 2223/1016* (2013.01)

(58) Field of Classification Search
  CPC .... G01J 1/429; G01J 3/0289; G01N 23/2076; G01N 2223/1016
  See application file for complete search history.

(56) References Cited

U.S. PATENT DOCUMENTS

| | | |
|---|---|---|
| 2013/0107899 A1 | 5/2013 | Matsunaga et al. |
| 2013/0170508 A1 | 7/2013 | Suzuki et al. |
| 2014/0374605 A1 | 12/2014 | Mizoguchi et al. |
| 2017/0336334 A1* | 11/2017 | Yun .................... G01N 23/2076 |
| 2017/0350575 A1* | 12/2017 | Hill .......................... G01J 3/10 |

* cited by examiner

[Fig. 1]
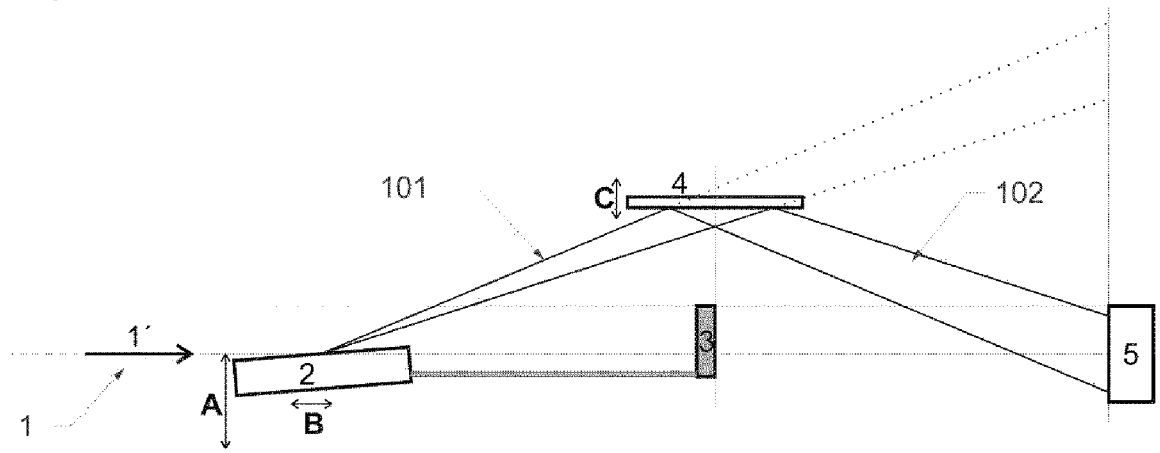
[Fig. 2]
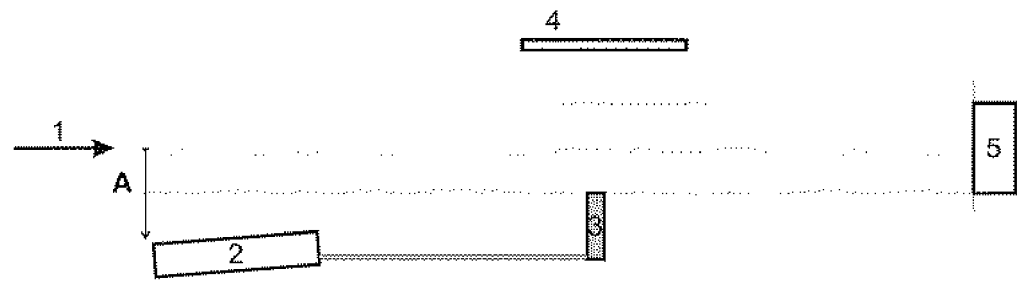
[Fig. 3]
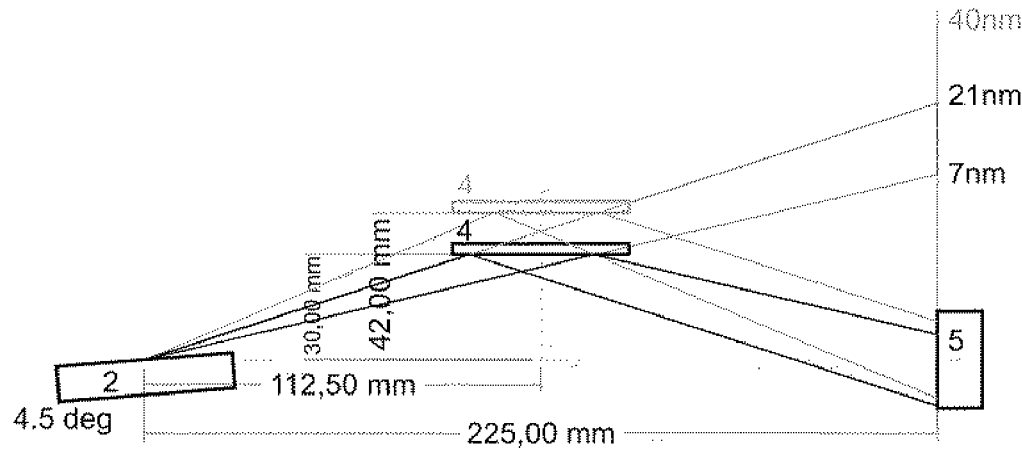

[Fig. 4]
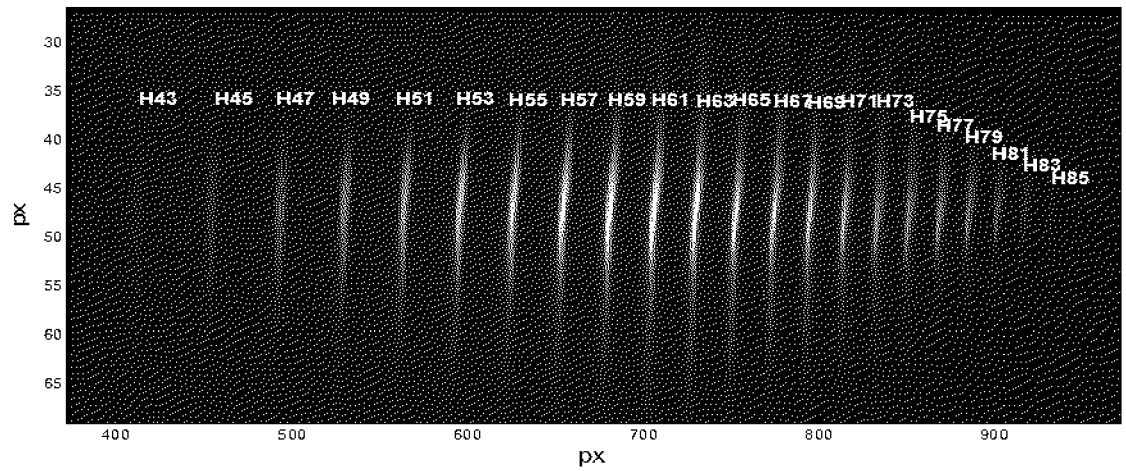
[Fig. 5]
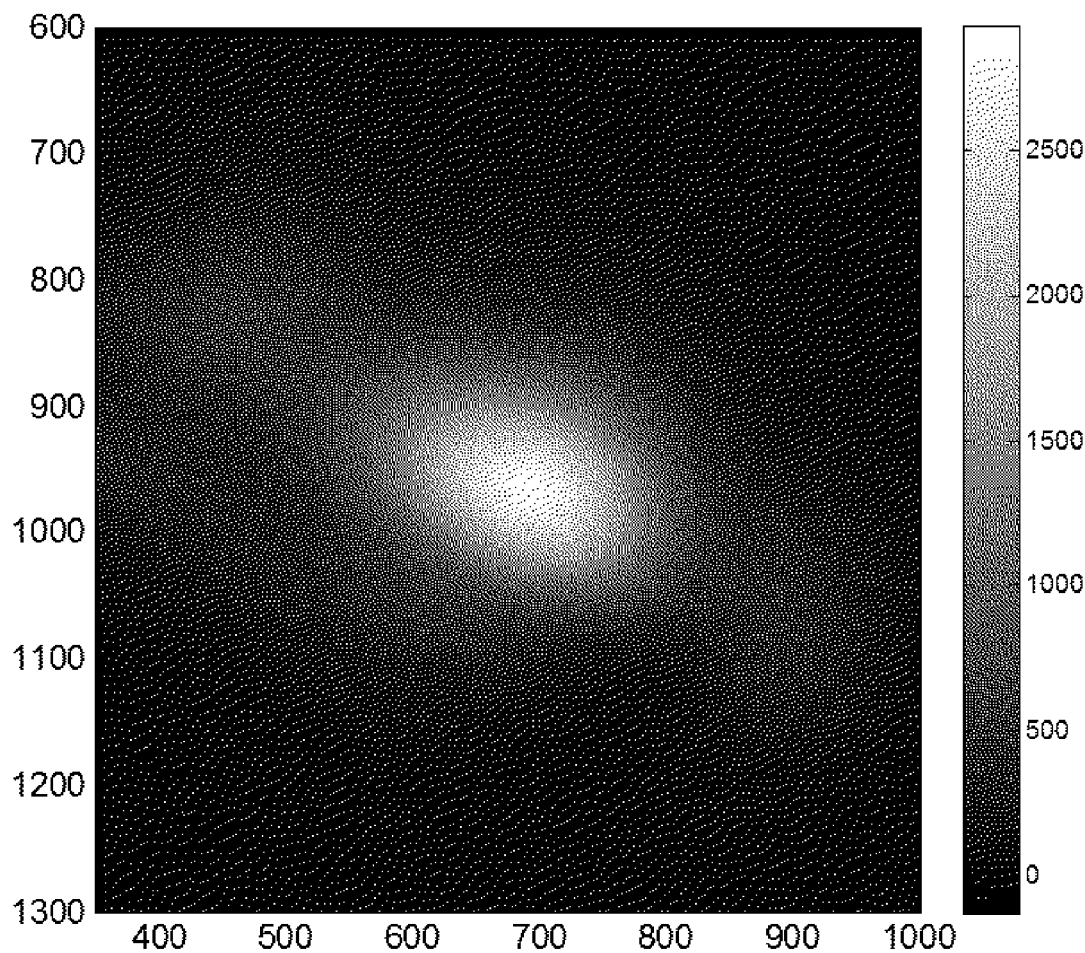

APPARATUS FOR SPECTRUM AND INTENSITY PROFILE CHARACTERIZATION OF A BEAM, USE THEREOF AND METHOD THEREOF

This application is the continuation of International Application No. PCT/CZ2017/050050, filed Oct. 21, 2017, which claims the benefit of Czech Patent Application No. PV 2016-661, filed 21 Oct. 2016, the entire contents of which are hereby incorporated by reference.

TECHNICAL FIELD

The present invention relates to a device, use and a method of characterization of a beam, preferably VUV, XUV, X-ray and visible. The present invention provides means to determine spectral and intensity profile characterization of the beam.

BACKGROUND ART

Spectrometers for characterization of spectrum ranging from the VUV to soft X-rays are well known, but none of them allows monitoring an incident beam profile, so the spectrometer is usually supplemented or replaced by another detector designed to measure the beam intensity profile. The use of two independent detectors is costly and can cause complications in evaluating acquired data since accurate calibration of detectors can be quite challenging.

Patent document US20120154902, which mentions the UV-XUV spectrometer as part of a more complex device, can be considered as the closest prior art. The spectrometer disclosed in the above mentioned document includes an entrance slit which collimates an incident XUV beam coming from the interaction chamber; XUV; and a detector for characterizing scattered radiation on a grating, wherein the detector is adjustable. The document also mentions the possibility of rotation of the grating to optimize the setup with respect to the incident beam. Under the above-described concept of dispersed radiation characterization, a person skilled in the art understands angular distribution of the radiation according to its wavelength. This concept of the spectrometer is known to those skilled in the art, but does not address the question of monitoring the radiation intensity profile.

Patent application US20130107899 discloses a laser apparatus comprising, inter alia, a spectral detection unit known to a person skilled in the art as a spectrometer. This spectral detection unit can measure the spectrum of the laser beam. However, a further unit, referred to as controller, is needed for the overall spectral characterization of the beam and for the characterization of the mean value of the wavelength and its intensity. The controller and the spectral detection unit are two separate systems that are electronically connected and have to be calibrated to each other. In addition, this document is described and the drawings also refer to the fact that two different detectors are required to obtain information on the intensity of the beam and beam spectrum. First energy detector (sensor) is dedicated to obtain intensity information and the other for spectral characterization. Another disadvantage of such a configuration is the need to divide the beam into two optical paths, wherein only a portion of the total beam intensity continues into the energy sensor and the second part is used for spectral analysis purposes. In this particular case, a grating may be used for spectral analysis, but a concave mirror is required to collimate the beam on the grating, representing another component that may provide additional measurement inaccuracy.

Patent application US20130170508 deals with an apparatus for generating UV light. As described in US20130107899 above, the technical solution includes a configuration of optical components that necessarily require calibration, requires beam splitting, and contains at least two independent detectors (sensors) for the purpose of characterizing the intensity and spectrum of the beam.

Patent application US20140374605 deals, inter alia, with an EUV (extreme ultraviolet) beam generator. The application only refers to a measuring unit located in the optical path of the beam for the purpose of detecting the beam profile.

SUMMARY OF INVENTION

According to one aspect, an object of the present invention is to provide an apparatus for spectrum and intensity profile characterization. In another aspect, the object is also to provide use thereof.

An apparatus for a beam spectrum and intensity profile characterization comprises:
 a diffractive element capable of diffracting the beam into spectral components;
 a beam block attached to the diffractive element;
 a reflective element configured to receive spectral components diffracted by the diffractive element;
 a fixed detector positioned on an axis of the beam and configured to receive reflected spectral components from the reflective element; and
 a device for translation of the beam block and the diffractive element; wherein the device is capable of translation in orthogonal direction with respect to the incident beam to block or unblock the beam.

According to one aspect of the apparatus, a beam may be a photon beam such as a photon beam from the visible to the XUV or X-ray spectral range. In another aspect, the beam may be a mass particle beam such as neutron beam or proton beam or light or heavy ion beam or electron beam or any charged or uncharged mass particle beam.

According to another aspect of the apparatus, the diffractive element may be a diffraction grating to diffract a photon beam into spectral components, i.e. beams travelling in different directions. In another embodiment, the diffractive element may be a crystal, in particularly to diffract an X-ray beam. In another embodiment, the diffractive element may be a material capable of neutron diffraction known as elastic neutron scattering for a neutron beam. The diffractive element may comprise a plurality of crystal monochromators as well as filters or crystal powders to select the desired neutron wavelength. It shall be known, that the same principle can be applied for diffractive element for electron beam or proton beam or heavy-ion or light-ion or mass particle beam.

In a preferred embodiment, wherein the beam is a photon beam, preferably XUV, VUV, X-ray or visible, the diffractive element is not a transmission grating. The absence of transmission grating (TG) provides effective spectral and intensity profile monitoring since no loses within the transmission grating is provided. Furthermore, the transmission grating cannot be used as it does not image the radiation source and it is needed to be coupled with an imaging element, i.e. slit.

In a preferred embodiment, wherein the beam is a photon beam, preferably XUV, VUV, X-ray or visible, the diffractive element is a concave reflection grating with a variable period of lines (sometimes referred to as aberration-corrected grating or as flat-field spectrometer grating) that angularly disperses the spectral components of the radiation and simultaneously focuses these components on a detector.

In accordance with the apparatus according to the invention, the beam block is attached to the diffractive element and blocks the passage of the part of the beam that does not impact on the diffractive element.

The reflective element is configured to receive the spectral components diffracted by the diffractive element and reflects the spectral components onto a fixed detector.

In a preferred embodiment, the reflective element is a plane mirror or any suitable reflectance material capable of reflecting radiant energy of the incident beam. Which serves to reflect the angularly dispersed components of the beam onto a fixed detector. In another preferred embodiment, the mirror is covered with a special layer increasing its reflectivity within a given spectral range for given beam.

In preferred embodiment, wherein said beam is VUV, a SiC layer on a mirror is used, or Au or Pt layer for XUV and soft X-rays. Such a layer covering the mirror can be a few tens of nanometres thick single layer or multilayer of different materials such as mentioned in EP3076208.

The fixed detector is used to detect both the spectral characteristics of the beam and to characterize the beam intensity profile. In a preferred embodiment, the detector is a CCD-based X-ray camera or other suitable type of available or specially developed detector of a given type of beam. This detector is positioned on the axis of the incoming beam. The detector used to characterization both, the spectral and intensity profile, positioned on the beam axis provides technical effect of calibration of single one detector. No method of cross-calibration is thus needed in order to detect both, the spectrum and intensity profile of the beam. Besides that, single detector provides a smaller probability of error during measurement.

In another embodiment, the device for translation is automatized for effective switching from the spectrum characterization mode to the mode of intensity profile monitoring and vice versa and optimizing the apparatus.

Depending on the above-mentioned individual components, the system can work for spectral regions from X-rays, preferably where wavelengths is from tenths of nm. The upper wavelength limit does not exist theoretically, but the primary objective is to characterize radiation with a wavelength shorter than 200 nm.

Besides that, an advantage of the whole apparatus according to the present invention is the possibility of working in two modes. Using the assembly of the above-mentioned components of one system, we are able to determine both the spectrum of the beam and its intensity profile. The device allows two modes of operation (the transition between these modes allows the translation of the block attached to the diffractive element indicated by the letter A in FIG. 1 and FIG. 2):

1) Spectrometric mode (FIG. 1): The diffractive element located on the beam axis (with the help of movement A) images the radiation source and spectrally disperses the beam coming from radiation source. The reflective element serves to direct the beams to the detector and to alter the spectral range of the detected radiation (via C translation). A diffractive element is mechanically connected to a beam block that serves to block a portion of the direct beam that would otherwise impact on the detector and reduce the quality of the detected spectrum. The translation of the diffractive element along the incoming beam direction (shift in direction B) allows focusing the source images in a given spectral range on detector surface.

2) Beam profile (FIG. 2): By removing the diffractive element and the beam block from the incoming beam axis, the beam impacts directly on the detector and thus its intensity profile can be measured.

It is provided another object of the invention, the use of the apparatus for determining the intensity profile and spectral characteristics of a photon beam, preferably XUV, X-RAY or VUV.

According to another aspect of the invention, a method of a beam spectrum and intensity profile characterization is provided. The method comprises the step of:
a diffraction of the beam using a diffractive element, wherein
the diffractive element disperses spectral components of the beam; and wherein
the diffractive element is attached to a beam block blocking the beam;
a reflection of the spectral components by a reflective element configured to receive the spectral components dispersed by the diffractive element;
detection of spectral components of the reflected beam by a fixed detector positioned on the axis;
translation of the beam block and the diffractive element from the axis of the beam; and
detection of the intensity profile of the beam.

It is understood that the step of intensity profile detection may be previous to spectral detection. The steps of the method according to the invention may be provided in any order.

In preferred embodiment, the method further comprises the step of focusing the spectral components, preferably via a concave reflection grating having variable period of lines capable to angularly disperse and simultaneously to focus spectral components of the diffracted beam.

In another embodiment, the step of detection of spectra or intensity profile of the beam is provided without conversion of the beam into a visible light.

BRIEF DESCRIPTION OF DRAWINGS

FIG. 1 is a schematic layout of the individual components of the compact system in the mode of spectral characterization of the beam.

FIG. 2 is a schematic layout of the individual components of the compact system in the mode of intensity profile measurement. The elements are labelled as in FIG. 1.

FIG. 3 is an example of an experiment working with XUV polychromatic radiation.

FIG. 4 shows the results of spectroscopic measurements (odd high harmonic frequencies of Ti: sapphire laser from order 43th to 85th generated in helium).

FIG. 5 shows the intensity profile of the same beam as in FIG. 4.

DESCRIPTION OF EMBODIMENTS

An apparatus according to present invention was constructed to determine the spectrum and the intensity profile of the beam 1 of high harmonic frequencies generated by the interaction of the intense femtosecond laser with the gaseous environment in the research center PALS (joint laboratory of Institute of Physics AS CR and Institute of Plasma Physics AS CR).

FIG. 3 represents a sketch of the apparatus according to the invention comprising:

a diffractive element 2 diffracting the beam 1 into spectral components 101;
a beam block 3 attached to the diffractive element 2;
a reflective element 4 configured to reflect the spectral components 101 diffracted on the diffractive element 2;
a fixed detector 5 positioned on the axis of the incoming beam 1 and configured to receive reflected spectral components 102 from the reflective element 4; and
a device for translation of the beam block 3 and the diffractive element 2; wherein the device is capable of movement in orthogonal direction A and/or parallel direction B with respect to the beam 1 to block or unblock the beam 1,
wherein the apparatus measures a spectrum in the range of 20 nm to 40 nm. The incoming beam 1 of radiation in direction 1' is incident on the reflective grating 2 where the beam 1 is angularly dispersed. For the purpose of the experiment, a "Hitachi 001-0437" reflective grating with a gold-coated surface and a mean line density of 1200 lines/mm set to an incidence angle of 4.5 degrees was used.

The dispersed beam 101 is then directed to a 5 cm long flat mirror 4 coated with gold for higher reflectivity, where the individual monochromatic components are reflected. The reflected components 102 are directed to an area detector 5. The detector was the X-ray CCD camera "Andor Icon-L 936". In this case, the beam block 3 serves to absorb a portion of the incoming beam in the direction 1' that missed the reflective grating 2. The resulting spectroscopic radiation characteristics are shown in FIG. 4. High harmonic frequencies are shown in this figure. H43 corresponds to the 43th harmonic frequency of the laser with wavelength 810/43 nm=18.8 nm, H85 then the 85th harmonic frequency with a wavelength of 9.5 nm.

FIG. 2 shows the assembly of components for the purpose of monitoring the beam intensity profile. We came into this mode by a mechanical translation A of the reflective grating 2 connected to the beam block 3. The incoming beam 1 in direction 1' is incident on the detector 5, the detector 5 being the same as in the previous case, i.e. the Andor Icon-L 936 X-ray CCD camera. The resulting intensity beam 1 profile is shown in FIG. 5.

INDUSTRIAL APPLICABILITY

The device and method according to the invention can be used for efficient spectral and intensity beam characterization, especially in XUV and X-ray spectral regions. The above-mentioned invention may be also used in characterization of spectrum and intensity or flux or fluence of a mass particle beam, such as neutron beam, as a part of application suitable for neutron scattering or radiation protection or in a material science such as neutron, proton, electron or X-ray scattering.

The invention claimed is:

1. An apparatus for a beam spectrum and intensity profile characterization, the apparatus comprising:
    a diffractive element capable of diffracting an incident beam into spectral components,
    a beam block configured to move together with the diffractive element, so that the beam block and diffractive element are capable to block or unblock the incident beam a reflective element configured to receive the spectral components diffracted from the diffractive element, a fixed detector positioned on an axis of the incident beam and configured to receive and detect reflected spectral components from the reflective element when the beam block is blocking the incident beam, and
    a device for translation configured to move the beam block together with the diffractive element in orthogonal direction (A) so that: the incident beam is diffracted on the diffractive element and the incident beam's spectral components are reflected on the reflective element, thereby providing spectrum characterization; or
    the incident beam is unblocked, thereby the beam is directly incident to the detector and providing intensity characterization.

2. The apparatus according to claim 1, wherein the incident beam is a photon beam, preferably XUV, VUV, X-RAY or visible.

3. The apparatus according to claim 2, wherein the diffractive element is not a transmission grating.

4. The apparatus according to claim 2, wherein the diffractive element is a concave reflection grating having variable period of lines capable to angular disperse and simultaneously to focus the spectral components of the incident beam.

5. The apparatus according to claim 1, wherein the reflective element is a planar mirror covered by a layer increasing its reflectivity.

6. The apparatus according to claim 2, wherein the detector is an X-ray camera, preferably CCD.

7. The apparatus according to claim 1, wherein the device for translation is automatized.

8. The apparatus according to claim 1, wherein the diffractive element is capable of movement (B) being parallel to the axis of the incident beam.

9. The apparatus according to claim 1, wherein the reflective element is capable of movement (C) being orthogonal to the axis of the incident beam.

10. The apparatus according to claim 4, wherein the concave reflection grating comprises a gold-coated surface and a mean line density is about 1200 lines/mm set to an incident angle of the incident beam is about 4.5°.

11. The apparatus according to claim 5, wherein the planar mirror is gold-coated for spectral region 1 nm-50 nm or coated by: a SiC layer for VUV spectral region or gold or platina layer for XUV and soft X-rays, or multilayers designed to reflect given spectral range.

12. A method for determining the intensity profile and spectral characteristics of an incident photon beam, preferably VUV, XUV, or X-rays, wherein the apparatus according to claim 1 is used.

13. A method of a beam spectrum and intensity profile characterization, the method comprising the steps of:
    diffracting of an incident beam using a diffractive element, wherein the diffractive element provides spectral components of the incident beam; and wherein the diffractive element is moving together with a beam block to block or unblock the incident beam;
    reflecting the spectral components of the incident beam by a reflective element configured to reflect the spectral components of the incident beam diffracted by the diffractive element, thereby providing reflected spectral components of the incident beam;
    detecting the reflected spectral components of the incident beam, wherein the detection is provided by a fixed detector positioned on an optical axis of the incident beam;

translating the beam block together with the diffractive element from the axis of the incident beam; and detecting of the intensity profile of the incident beam.

14. The method according to claim 13, wherein the incident beam is a photon beam, preferably visible, VUV, XUV, or X-rays.

15. The method according to claim 13, wherein the method further comprises the step of focusing the reflected spectral components of the incident beam on the detector.

16. The method according to claim 13, wherein the spectral or intensity profile characterization of the incident beam is provided without conversion of the incident beam into a visible light.

* * * * *